(12) United States Patent
Nagahama et al.

(10) Patent No.: US 8,891,090 B2
(45) Date of Patent: Nov. 18, 2014

(54) LIGHT-INTERFERENCE MEASURING APPARATUS

(75) Inventors: Tatsuya Nagahama, Kawasaki (JP); Koji Kubo, Kawasaki (JP); Hidemitsu Asano, Kawasaki (JP); Jyota Miyakura, Kawasaki (JP)

(73) Assignee: Mitutoyo Corporation, Kanagawa (JP)

( * ) Notice: Subject to any disclaimer, the term of this patent is extended or adjusted under 35 U.S.C. 154(b) by 288 days.

(21) Appl. No.: 13/023,984

(22) Filed: Feb. 9, 2011

(65) Prior Publication Data

US 2011/0222069 A1 Sep. 15, 2011

(30) Foreign Application Priority Data

Mar. 12, 2010 (JP) ................................. 2010-055973

(51) Int. Cl.
*G01B 11/02* (2006.01)
*G01B 9/02* (2006.01)

(52) U.S. Cl.
CPC ........ *G01B 9/02068* (2013.01); *G01B 9/02057* (2013.01); *G01B 9/0209* (2013.01)
USPC ...................................................... 356/497

(58) Field of Classification Search
USPC ......... 356/358, 357, 457, 359, 485, 492, 497, 356/479, 511, 512, 516, 495, 489; 250/201.3; 259/9, 11, 35
See application file for complete search history.

(56) References Cited

U.S. PATENT DOCUMENTS

| | | | |
|---|---|---|---|
| 4,340,306 A * | 7/1982 | Balasubramanian | 356/513 |
| 5,080,466 A * | 1/1992 | Boothroyd et al. | 359/577 |
| 5,166,751 A | 11/1992 | Massig | |
| 5,491,580 A * | 2/1996 | O'Meara | 359/247 |
| 5,537,209 A * | 7/1996 | Lis | 356/487 |
| 5,589,938 A * | 12/1996 | Deck | 356/497 |
| 5,675,413 A * | 10/1997 | Prikryl et al. | 356/508 |
| 5,706,091 A | 1/1998 | Shiraishi | |

(Continued)

FOREIGN PATENT DOCUMENTS

| | | |
|---|---|---|
| CN | 1952594 A | 4/2007 |
| CN | 101324421 A | 12/2008 |

(Continued)

OTHER PUBLICATIONS

Shi."Design and analysis of metal-dielectric nonpolarizing beam splitters in a glass cube" Jun. 20, 2009.Applied Otptics vol. 48. p. 1.*
S. Dutch. Why minerals are Colored.Sep. 30, 1998. University of Wisconsin p. 5.*
Costich, V.R.Reduction of Polarization Effects in Interference ,vol. 9, No. 4, Applied Optics Apr. 1970.*

(Continued)

*Primary Examiner* — Kara E Geisel
*Assistant Examiner* — Maurice Smith
(74) *Attorney, Agent, or Firm* — Oliff PLC

(57) ABSTRACT

A light-interference measuring apparatus including: a light source of a broad band light; an objective lens section to branch an optical path of the broad band light into a reference optical path including a reference mirror and a measuring optical path including a measuring object and to output a superposed wave of two branched lights; and an optical path length changing section to change an optical path length of either the reference optical path or the measuring optical path; wherein the objective lens section includes a phase difference control member to control a phase difference between the reference light and the object light to generate destructive interference fringes, and a minimum luminance position detecting section to detect minimum luminance position of the destructive interference fringes.

5 Claims, 13 Drawing Sheets

(56) References Cited

U.S. PATENT DOCUMENTS

| | | | |
|---|---|---|---|
| 5,784,164 A * | 7/1998 | Deck et al. | 356/511 |
| 6,134,009 A * | 10/2000 | Zavislan | 356/364 |
| 6,275,625 B1 * | 8/2001 | Bergmann | 385/18 |
| 6,501,553 B1 * | 12/2002 | Ogawa et al. | 356/512 |
| 7,265,834 B2 * | 9/2007 | Kawakami et al. | 356/364 |
| 2002/0085209 A1 * | 7/2002 | Mittleman et al. | 356/497 |
| 2006/0087658 A1 * | 4/2006 | Sesko et al. | 356/493 |
| 2006/0091334 A1 * | 5/2006 | Urbach et al. | 250/559.45 |

FOREIGN PATENT DOCUMENTS

| | | |
|---|---|---|
| EP | 0 740 130 A2 | 10/1996 |
| JP | A-08-327318 | 12/1996 |
| JP | A-09-113217 | 5/1997 |
| JP | A-10-197210 | 7/1998 |
| JP | A-2003-148921 | 5/2003 |
| JP | A-2006-126192 | 5/2006 |
| JP | A-2009-015180 | 1/2009 |
| TW | 200846621 A | 12/2008 |
| WO | WO 94/00733 A1 | 1/1994 |

OTHER PUBLICATIONS

Shi. Design and analysis of metal-dielectric nonpolarizing beam splitters in a glass cube.vol. 48, No. 18,Applied Optics May 26, 2009.*

Rabinovitch. "Multilayer antireflection coatings: theoretical model and design parameters" Jun. 1975.*

V.R. Costich. "Reduction of Polarization Effects in Interference Coatings". Apr. 1970.*

Lawrence R. Lawson, "A Quarter-wave Plate using Metal Plate Optics", 2008.*

European Search Report issued in Application No. 11157547.8 dated Jun. 28, 2011.

Sep. 17, 2013 Office Action issued in Japanese Application No. 2010055973 (with English translation).

Apr. 28, 2014 Notification of First Office Action issued in Chinese Patent Application No. 201110057679.4 (with English translation).

Apr. 8, 2014 Decision of Refusal issued in Japanese Patent Application No. 2010-055973 (with English translation).

* cited by examiner

LIGHT WAVE OF REFERENCE LIGHT

LIGHT WAVE OF OBJECT LIGHT

INTERFERENCE OF LIGHT WAVES OF REFERENCE LIGHT AND OBJECT LIGHT

FIG.11A LIGHT WAVE OF REFERENCE LIGHT
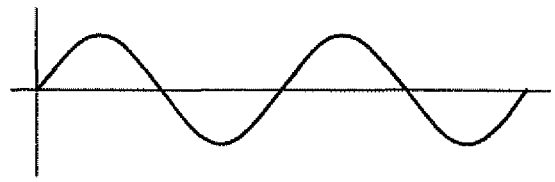
LIGHT WAVE OF OBJECT LIGHT
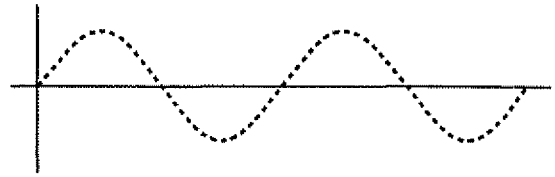
FIG.11B INTERFERENCE OF LIGHT WAVES OF REFERENCE LIGHT AND OBJECT LIGHT
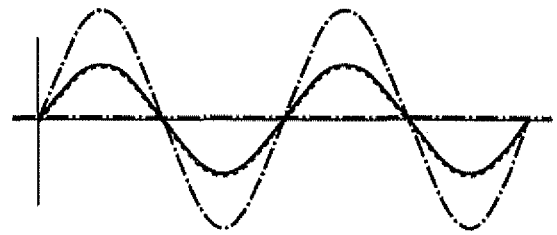
FIG.11C
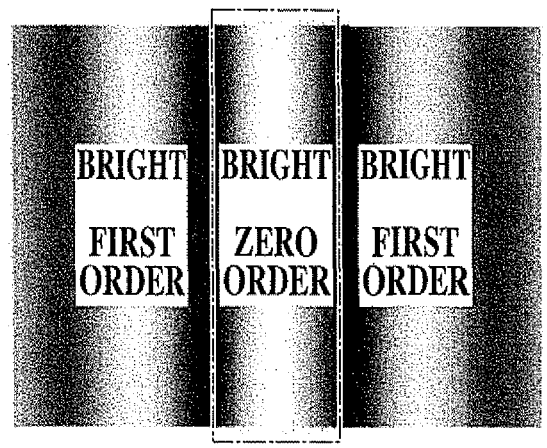

LIGHT-INTERFERENCE MEASURING APPARATUS

BACKGROUND OF THE INVENTION

1. Field of the Invention

The present invention relates to a light-interference measuring apparatus.

2. Description of the Related Art

Conventionally, there is known a light-interference measuring apparatus such as a three-dimensional shape measuring apparatus. The three-dimensional shape measuring apparatus precisely measures the three-dimensional shape of a measuring object, for example, by using the luminance information of interference fringes generated by the interference of lights. A technique using a broad band light (white light and the like) as a light source is widely known in this light-interference measuring apparatus (see, for example, Japanese Patent Application Laid-Open Publication No. 2003-148921).

FIGS. 9A and 9B show an example of interference fringes obtained by using the broad band light as the light source. FIG. 9A shows the luminance of interference fringes of respective wavelength and FIG. 9B shows the luminance of superposed interference fringes.

As shown in FIGS. 9A and 9B, when the broad band light is used as the light source, the peaks of luminance of the interference fringes of the respective wavelengths overlap one another and the luminance of the overlapped interference fringes becomes larger at the focused position. However, the more distant from the focused position, the larger the maximum luminance positions of the interference fringes of the wavelengths shift from each other and the amplitude of the luminance of the superposed interference fringes be smaller gradually.

Therefore, the light-interference measuring apparatus can consequently measure, for example, the three-dimensional shape of a measuring object by detecting the position of peak luminance at each position in a visual field.

The interference objective lenses to be used for such light-interference measuring apparatus mainly include Michelson type lenses and Mirau type lenses, which are used according to the magnification ratios of the interference objective lenses. In general, the Michelson type lenses are used for the interference objective lenses of low magnification ratios, and the Mirau type lenses are used for the interference objective lenses of high magnification ratios.

FIG. 10 is a schematic view showing the basic configuration when the Mirau type interference objective lens is used.

As shown in FIG. 10, in the case where the Mirau type interference objective lens is used, an optical path of light emitted from the interference objective lens is branched by a beam splitter into a reference optical path (denoted by the broken line in the drawing) including a reference mirror therein and a measuring optical path (denoted by the solid line in the drawing) including a measuring object arranged therein. Thereafter, reflected light from the reference mirror (reference light) and reflected light from the measuring object (object light) are superposed.

At the focused position, that is, when the optical path lengths of the reference optical path and the measuring optical path are equal to each other, here, the respective lights become light waves having same phase with each other as shown in FIG. 11A.

Therefore, the respective light waves of the reference light and the object light reinforce each other at the focused position and become an interference wave as shown in FIG. 11B.

A condition of actual interference fringes in such an optical system is shown in FIG. 11C. In FIG. 11C, a bright zero-order interference fringe is observed at the focused position, and bright first-order interference fringes are observed around the focused position.

SUMMARY OF THE INVENTION

However, when an object in which parts having different reflectances such as a part having a high reflectance (high reflectance part) and a part having a low reflectance (low reflectance part) in a visual field as shown in FIG. 12 is to be measured with such the above described light-interference measuring apparatus, the light quantity necessary for the measurement of each part in the visual field is different from each other.

FIG. 13A shows an example of the contrast of the interference fringes obtained when the light quantity is adjusted based on the high reflectance part and FIG. 13B shows an example of the contrast of the interference fringes obtained when the light quantity is adjusted according to the low reflectance part. Here, the interference fringes in the high reflectance part are shown by the solid lines, and the interference fringes in the low reflectance part are shown by the broken lines in FIGS. 13A and 13B.

As shown in FIG. 13A, when the light quantity is adjusted based on the high reflectance part, the luminance of the interference fringes in the low reflectance part becomes low and the maximum luminance positions thereof be difficult to detect.

Further, as shown in FIG. 13B, when the light quantity is adjusted based on the low reflectance part, the luminance of the high reflectance part may exceed the tolerance of an imaging device causing the saturation in the imaging device.

Consequently, when a measuring object including parts having different reflectances is to be measured, conventionally, there has been the problem of the necessity of the processing of carrying out the measurement of the measuring object twice by the use of different light quantities and synthesizing data thereafter, causing the throughput to be lowered.

An object of the present invention is to provide a light-interference measuring apparatus enabling a user to easily perform measurement even at the time of measuring a measuring object including parts having different reflectances.

In order to solve the problem, a light-interference measuring apparatus according to the present invention includes:

a light source to output a broad band light;

an objective lens section to branch an optical path of the broad band light output from the light source into a reference optical path including a reference mirror and a measuring optical path including a measuring object, and to output a superposed wave of a reference light reflected by the reference mirror and an object light reflected by the measuring object;

an optical path length changing section to change an optical path length of either the reference optical path or the measuring optical path; and an imaging section to form an interference image data of the superposed wave output from the objective lens section, wherein the objective lens section includes;

a phase difference control member to control a phase difference between the reference light and the object light to generate destructive interference fringes at a position at which an optical path difference between the reference optical path and the measuring optical path is zero, and a minimum luminance position detecting section to detect a minimum luminance position of the destructive interference fringes based on the interference image data formed by the imaging section.

In addition, in the light-interference measuring apparatus according to the present invention, the phase difference control member is preferably a thin film including a dielectric multilayer film.

In addition, in the light-interference measuring apparatus according to the present invention, a metal film is preferably laminated on the dielectric multilayer film.

In addition, in the light-interference measuring apparatus according to the present invention, the objective lens section preferably includes a beam splitter to branch the optical path of the broad band light output from the light source into the reference optical path and the measuring optical path;

the phase difference control member is attached to the beam splitter; and a light passing through the measuring optical path transmits through the phase difference control member twice and thereby a phase of the transmitted light is reversed by 180°.

In addition, in the light-interference measuring apparatus according to the present invention, in the objective lens section, the phase difference control member is preferably arranged at a reflection surface side of the reference mirror; and a light passing through the reference optical path is transmits through the phase difference control member twice before and after being reflected by the reference mirror and thereby a phase of the light is reversed by 180°.

According to the present invention, the destructive interference fringes are generated at the position where the optical path difference is zero, and the minimum luminance position of the destructive interference fringes is detected. Because the minimum luminance positions of the detected destructive interference fringes do not cause any saturation, even when the measuring object includes a high reflectance part and a low reflectance part, the minimum luminance position can be detect at one time.

Consequently, even in the case of measuring the measuring object including the parts having different reflectances, the measurement can easily be performed.

BRIEF DESCRIPTION OF THE DRAWINGS

The present invention will more fully be understood by the following detailed description and the accompanying drawings, but those are only for description and are not intended to limit the scope of the present invention, wherein:

FIG. 11A is a diagram showing light waves of a reference light and a object light produced by a conventional apparatus;

FIG. 11B is a diagram showing the interference of the reference light and the object light produced by the conventional apparatus;

FIG. 11C is a diagram showing an example of the actual interference fringes produced by the conventional apparatus;

DETAILED DESCRIPTION OF THE PREFERRED EMBODIMENTS

Hereinafter, a three-dimensional shape measuring apparatus (hereinafter referred to as a shape measuring apparatus) as a light-interference measuring apparatus according to the present invention will be described in detail with reference to the accompanying drawings.
(First Embodiment)

The shape measuring apparatus 1 of the embodiment uses a Mirau type optical head.

Figure 1:
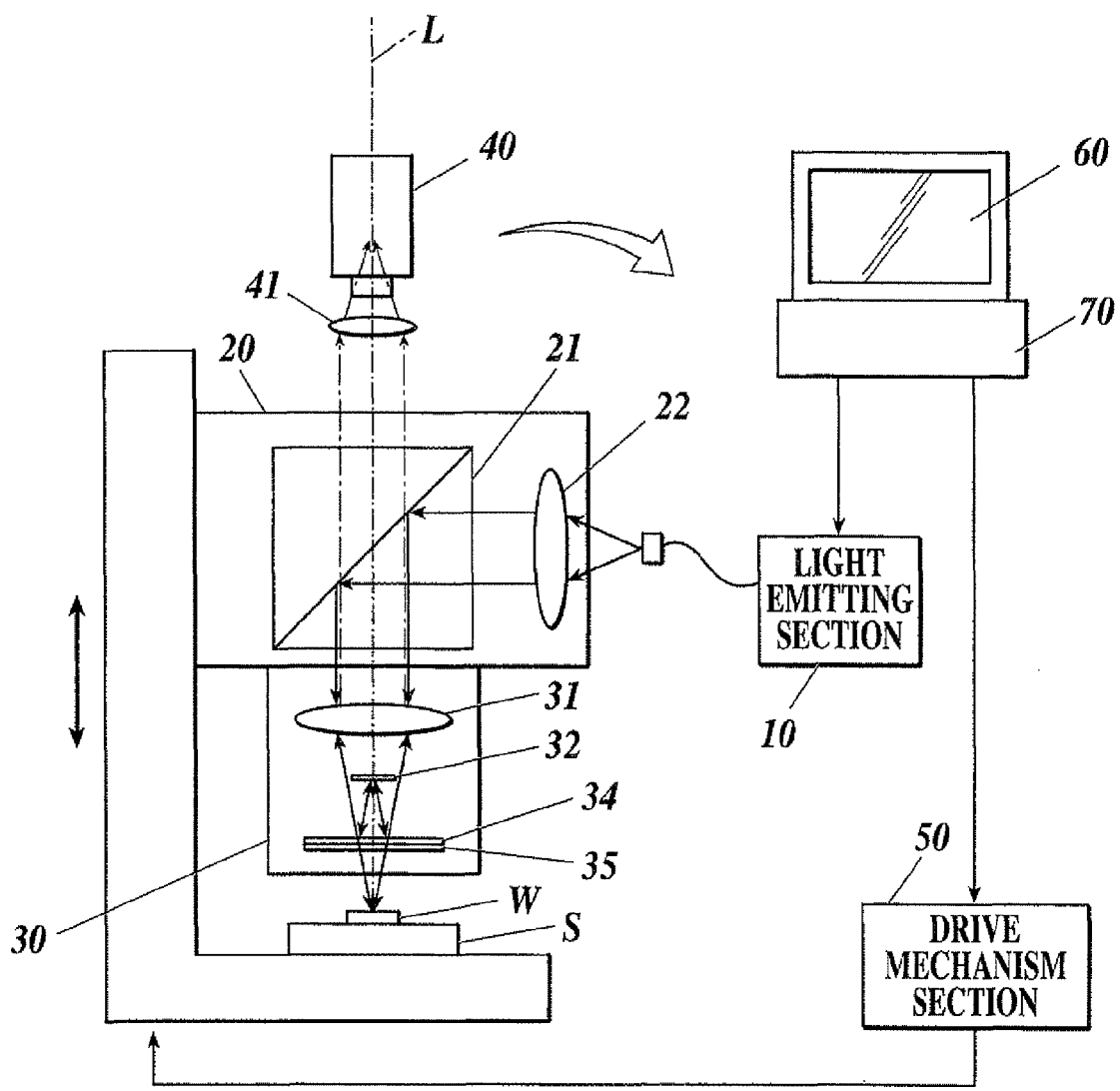
FIG. 1 is a schematic view showing an overall configuration of a three-dimensional shape measuring apparatus as the light-interference measuring apparatus of the first embodiment.

As shown in FIG. 1, the shape measuring apparatus 1 includes a light emitting section 10, an optical head section 20, an objective lens section 30, an image forming lens 41, an imaging section 40, a drive mechanism section 50, a display section 60, a control section 70 and a stage S for placing a measuring object (section to be measured) W thereon.

The light emitting section 10 includes a light source which outputs a broad band light including a plurality of wavelength components ranging over a wide band, the broad band light having low coherency. As for the light source, for example, a white light source such as a halogen lamp or a light emitting diode (LED) can be used.

The optical head section 20 includes a beam splitter 21 and a collimator lens 22. The light emitted from the light emitting section 10 is collimated through the collimator lens 22, and the collimated light is radiated to the beam splitter 21 from the direction orthogonal to the optical axis L of the objective lens section 30. The collimated light reflected by the beam splitter 21 is emitted downward along the optical axis L, and the collimated light is radiated to the objective lens section 30 from above.

Figure 2:
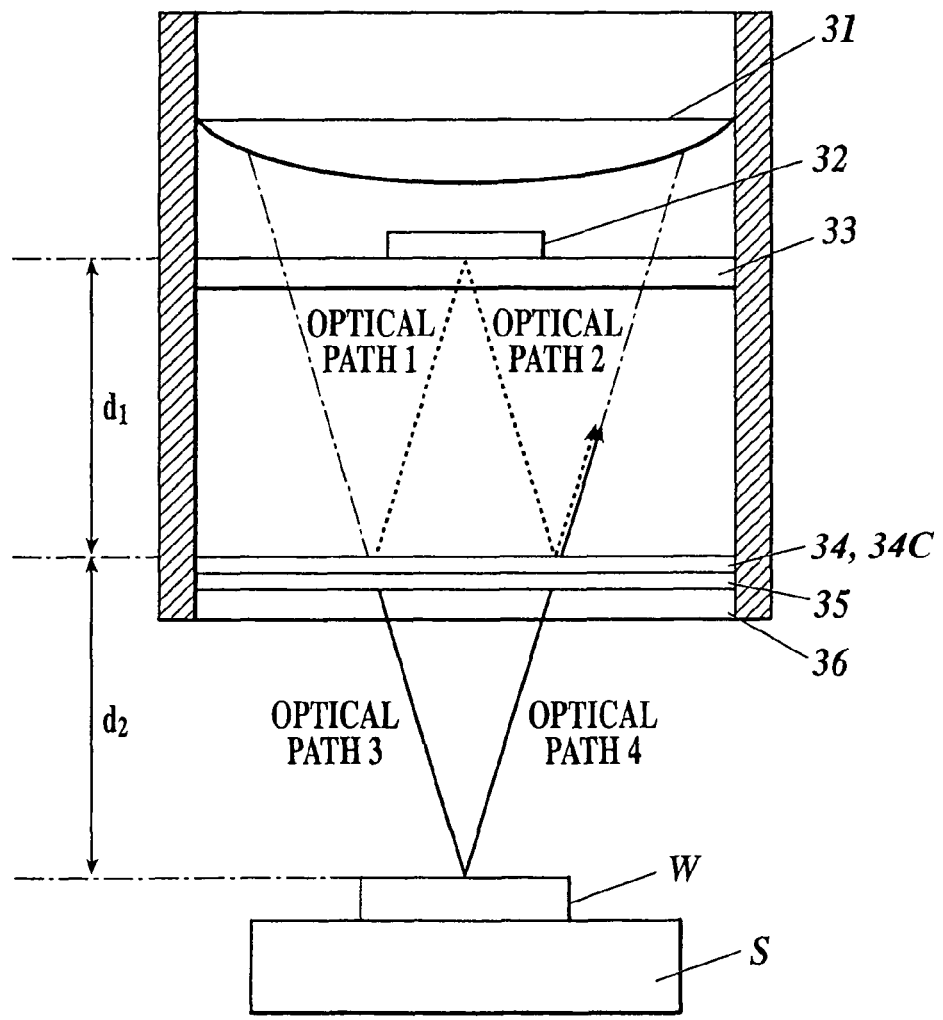
FIG. 2 is a principal part enlarged view showing the configuration of the objective lens section in the three-dimensional shape measuring apparatus of FIG. 1.

As shown in FIG. 2, the objective lens section 30 includes an objective lens 31, a glass plate 33 having a reference mirror 32, a beam splitter 35 having a phase difference control member 34 and a glass plate 36 placing the beam splitter 35 thereon in the order from the upper part on the same optical axis L. The measuring object W is placed on the stage S below the objective lens section 30.

An interference operation will be described here by using FIG. 2 on the supposition that a collimated light has entered the objective lens 31 from the upper part of the objective lens section 30 through the optical head section 20. Here, the description will be given by using the optical paths along the arrows in FIG. 2, however, the actual interference occurs in rotational symmetry with respect to the optical axis L.

The incident light which entered the objective lens 31 becomes a convergent light in the objective lens 31 to enter the beam splitter 35 having the phase difference control member 34 thereon. Here, the optical path of the convergent light which entered the beam splitter 35 is branched into a reference optical path (denoted by the broken line in FIG. 2) with the reference mirror 32 therein, in which a light reflected by the beam splitter 35 advances, and a measuring optical path (denoted by the solid line in FIG. 2) with the measuring object W arranged therein, in which the light passed through the beam splitter 35 advances.

The reflected light which is reflected by the beam splitter 35 converges to be reflected by the reference mirror 32, and thereafter, the reflected light which is reflected by the reference mirror 32 is reflected again by the beam splitter 35 having the phase difference control member 34 thereon. On the other hand, the transmitted light which is transmitted through the beam splitter 35 converges to irradiate one point of the measuring object W, and is reflected at the point to enter and transmit through the beam splitter 35 having the phase difference control member 34 thereon again. Here, the reflected light from the reference mirror 32 (reference light) and the reflected light from the measuring object W (object light) are superposed by the beam splitter 35 having the phase difference control member 34 thereon to form a superposed wave.

The superposed wave becomes a parallel beam in the objective lens 31 to advance (upward) to the upper part (denoted by the alternate long and short dash line in FIG. 1) and enters the image forming lens 41. When the optical path lengths of the reference optical path (optical path 1+ optical path 2) and the measuring optical path (optical path 3+ optical path 4) are equal to each other, interference fringes are generated.

Thereafter, the superposed wave converges in the image forming lens 41 to enter the imaging section 40, and then focuses on the imaging section 40, and the imaging section forms an interference image data. The interference image data is taken into the control section 70 and a predetermined image processing is carried out to the interference image data.

In such objective lens section 30, the beam splitter 35 includes the phase difference control member 34 thereon as described above.

The phase difference control member 34 is a thin film containing a dielectric multilayer film 34C of $TiO_2$ or the like and shifts the phase of the light which transmits therethrough by 90°.

In the embodiment, the phase difference control member 34 is attached to the beam splitter 35. Therefore, the object light which passes through the measuring optical path transmits through the phase difference control member 34 twice and the phase of the object light is reversed by 180°.

Figure 4A:
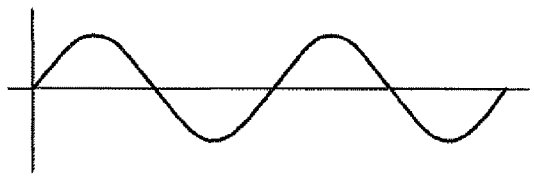
FIG. 4A is a diagram showing light waves of a reference light and an object light.
Figure 4A:
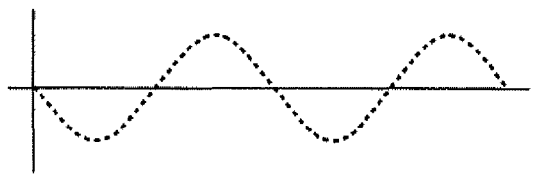
Figure 4B:
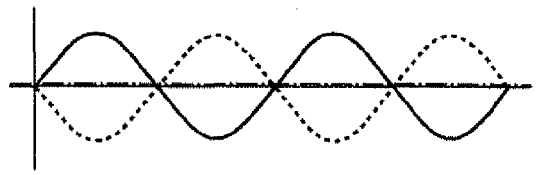
FIG. 4B is a diagram showing the interference of the reference light and the object light.
Figure 4C:
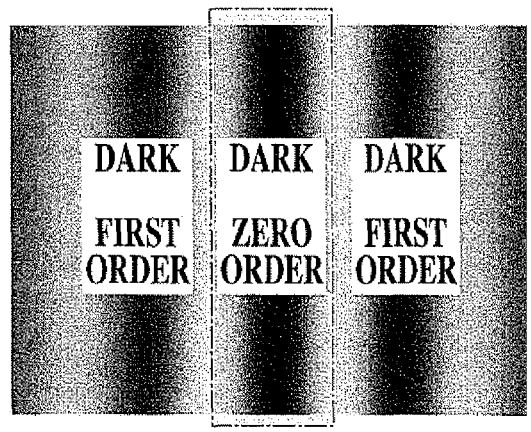
FIG. 4C is a diagram showing an example of the actual interference fringes.

Thereby, each of the lights becomes a light wave having opposite phase from each other at the focused position as shown in FIGS. 4A to 4C, and destructive interference fringes are generated because the light waves cancel each other. Here, the "focused position" indicates the position at which the optical path lengths of the reference optical path and the measuring optical path are equal to each other, that is, the position at which the optical path difference between the reference optical path and the measuring optical path is zero (the position at which the optical path difference is zero).

As described above, the phase difference control member 34 has the function of controlling the phase difference between the reference light and the object light to generate destructive interference fringes at the position at which the optical path difference is zero in the objective lens section 30.

The imaging section 40 is a charge coupled device (CCD) camera composed of a two-dimensional imaging device for constituting the imaging section, or the like. The imaging section 40 forms an interference image data of a superposed wave (of the reference light and the object light) output from the objective lens section 30.

The interference image data formed by the imaging section 40 is taken into the control section 70 as an electric signal and a predetermined image processing is carried out to the image data. Thereafter, the interference image is displayed on the display section 60.

The drive mechanism section 50 moves the optical head section 20 in the direction of the optical axis L in conformity with a moving instruction from the control section 70.

The objective lens section 30 is moved with the optical head section 20 in the direction of the optical axis L, and the focused position of the objective lens 31 is set at a predetermined position on the surface of the measuring object W.

Here, the difference between the optical lengths becomes zero at the position of $d_1=d_2$ in FIG. 2. The distance $d_1$ indicates the distance from the beam splitter 35 with the phase difference control member 34 thereon to the reference mirror 32, and the distance $d_2$ indicates the distance from the beam splitter 35 with the phase difference control member 34 thereon to the surface position of the measuring object W.

Therefore, the drive mechanism section 50 moves the optical head section 20 and the objective lens section 30 in the direction of the optical axis L at the time of measurement in order that the difference between the optical lengths may be zero ($d_1=d_2$) to adjust the distance $d_2$.

In the above, although the case of moving the optical head section 20 and the objective lens section 30 is exemplified to be described, the configuration of adjusting the distance $d_2$ by moving the stage S may also be adopted.

Further, the configuration of changing the distance $d_1$ from the beam splitter 35 to the reference mirror 32 can may also be adopted.

As described above, the drive mechanism section 50 changes either of the optical path length of the reference optical path or the measuring optical path as the optical path length changing section.

The display section 60 is a monitor to be mounted on a personal computer or the like, for example, and displays the image data of an interference image which is taken into the control section 70 and to which a predetermined image processing and the like are carried out.

Figure 3:
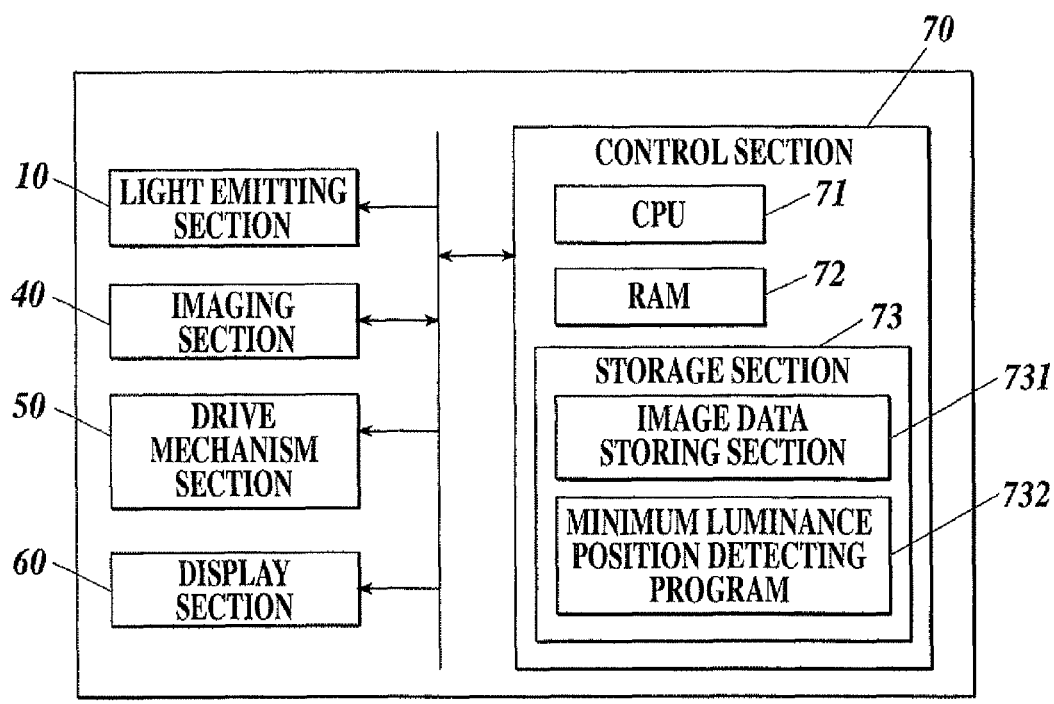
FIG. 3 is a block diagram showing a control configuration of the three-dimensional shape measuring apparatus of FIG. 1.

As shown in FIG. 3, the control section 70 includes a central processing unit (CPU) 71, a random access memory (RAM) 72, a storage section 73, and the like.

The CPU 71 performs various types of control processing in conformity with various types of processing programs stored in the storage section 73, for example.

The RAM 72 forms a working memory area for storing the data to which an arithmetic processing is carried out by the CPU 71.

For example, the storage section 73 stores a system program capable of being executed by the CPU 71, various types of processing programs capable of being executed by the system program, data to be used at the time of the execution of the various types of processing programs, and data of the results of various types of processing obtained by the arithmetic processing being carried out to the data by the CPU 71. Incidentally, the programs are stored in the storage section 73 in the form of program codes capable of being read by a computer.

In particular, the storage section 73 stores an image data storing section 731 and a minimum luminance position detecting program 732, for example.

The image data storing section 731 stores the image data of interference images formed by the imaging section 40 as a plurality of frames.

Here, the image data stored in the image data storing section 731 is stored after the interference intensity value and the like thereof are properly corrected on the basis of the correction table or the like created in advance in order to exclude, for example, the influences of the sensitivity characteristic of the imaging section 40 and the like.

The minimum luminance-position detecting program 732 is a program, for example, for enabling the CPU 71 to realize the function of detecting the minimum luminance position of the destructive interference fringes which are generated at the position at which the optical path difference is zero based on the interference image data formed by the imaging section 40.

In particular, when interference fringes are generated, the CPU 71 detects the position at which the intensity changes of the interference fringes show the minimum intensity as the position at which the optical path difference is zero.

The CPU 71 functions as a minimum luminance position detecting section by executing the minimum luminance-position detecting program 732 described above.

Next, the minimum luminance position detecting processing by the shape measuring apparatus 1 of the embodiment will be described in detail.

First, the measuring object W is mounted on the stage S; the distance between the measuring object W and the objective lens section 30 is adjusted by the drive mechanism section 50; and the focused position of the objective lens is detected by perceiving the interference fringes generated on the basis of the principle described above.

The beam splitter 35 includes the phase difference control member 34 which shifts the phase of a transmitted light by 90° in the shape measuring apparatus 1. Therefore, at a focused position where the optical path lengths of the reference optical path and the measuring optical path are equal to each other, the phase of the object light is shifted by 180° from the phase of the reference light as shown in FIG. 4A. Then, because the phases of the lights are shifted by 180° from each other, the light waves weaken each other, and the superposed wave of the reference light and the object light becomes the destructive interference wave as shown in FIG. 4B.

A state of the actual interference fringes in this optical system is shown in FIG. 4C. In FIG. 4C, a zero-order destructive interfering fringe is observed at the focused position, and first-order destructive interfering fringes are observed around the focused position.

A case of measuring a measuring object including parts having different reflectances will be examined here.

Figure 5:
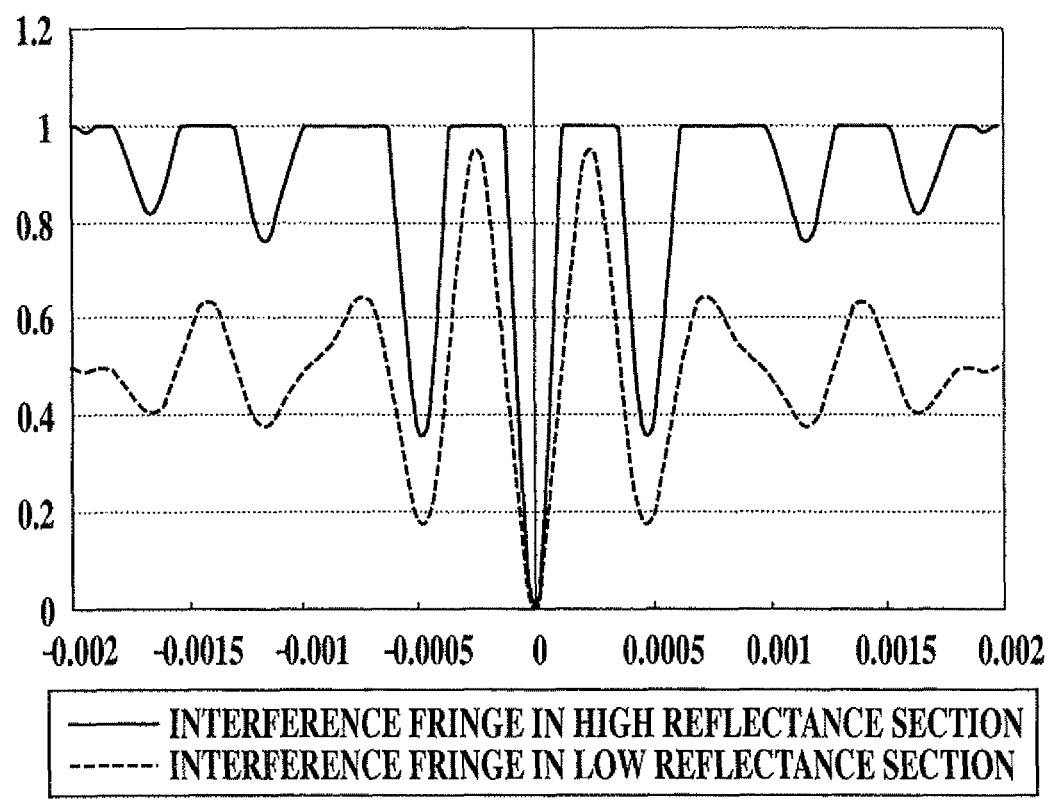
FIG. 5 is a diagram showing the contrasts of interference fringes obtained by the three-dimensional shape measuring apparatus of FIG. 1.

FIG. 5 shows an example of the contrast of interference fringes obtained by adjusting the light quantity of the shape measuring apparatus 1 of the present embodiment based on a low reflectance part by using the shape measuring apparatus. Here, the interference fringes of a high reflectance part is shown by the solid line, and the interference fringes of the low reflectance part is shown by the broken line in FIG. 5.

As shown in FIG. 5, when the light quantity of the shape measuring apparatus 1 is adjusted to that at the low reflectance part, then the luminance of some parts of the interference fringes in the high reflectance part exceeds the tolerance of an imaging device causing the saturation thereof. However, saturation is not caused at the minimum luminance position of the dark parts to be detected. It is, consequently, found that both of the high reflectance part and the low reflectance part can be detected.

That is, when bright positions and dark positions of the fringes are reversed, even a measuring object having parts having different reflectances can be measured.

As described above, the shape measuring apparatus 1 of the embodiment generates destructive interference fringes at the position at which the optical path difference is zero, and detects the minimum luminance position of the destructive interference fringes. Because saturation is not caused at the minimum luminance position of the destructive interference fringes to be detected, the minimum luminance position can be detected at once even in a measuring object including a high reflectance part and a low reflectance part.

Therefore, even when measuring a measuring object including parts having reflectances different from each other, the measuring object can be measured easily.

Further, the phase difference control member 34 of the shape measuring apparatus 1 of the embodiment is a thin film containing a dielectric multilayer film. The destructive interference fringes can be generated at a position at which the optical path difference is zero only by attaching a thin film containing a dielectric multilayer film to the beam splitter 35. Therefore, the installation of the shape measuring apparatus 1 is easy.

Furthermore, the objective lens section 30 of the shape measuring apparatus 1 of the embodiment includes the beam splitter 35 which branches an optical path of the broad band light output from the light emitting section 10 into the reference optical path and the measuring optical path.

Moreover, the phase difference control member 34 of the shape measuring apparatus 1 is attached to the beam splitter 35, and the phase of the object light passing through the measuring optical path is adapted to be reversed by 180° by transmitting through the phase difference control member 34 twice.

The destructive interference fringes can be generated at the position at which the optical path difference is zero only by attaching the phase difference control member 34 to the beam splitter 35. Therefore, the installation of the shape measuring apparatus 1 is easy.

(First Modification)

Figure 6:
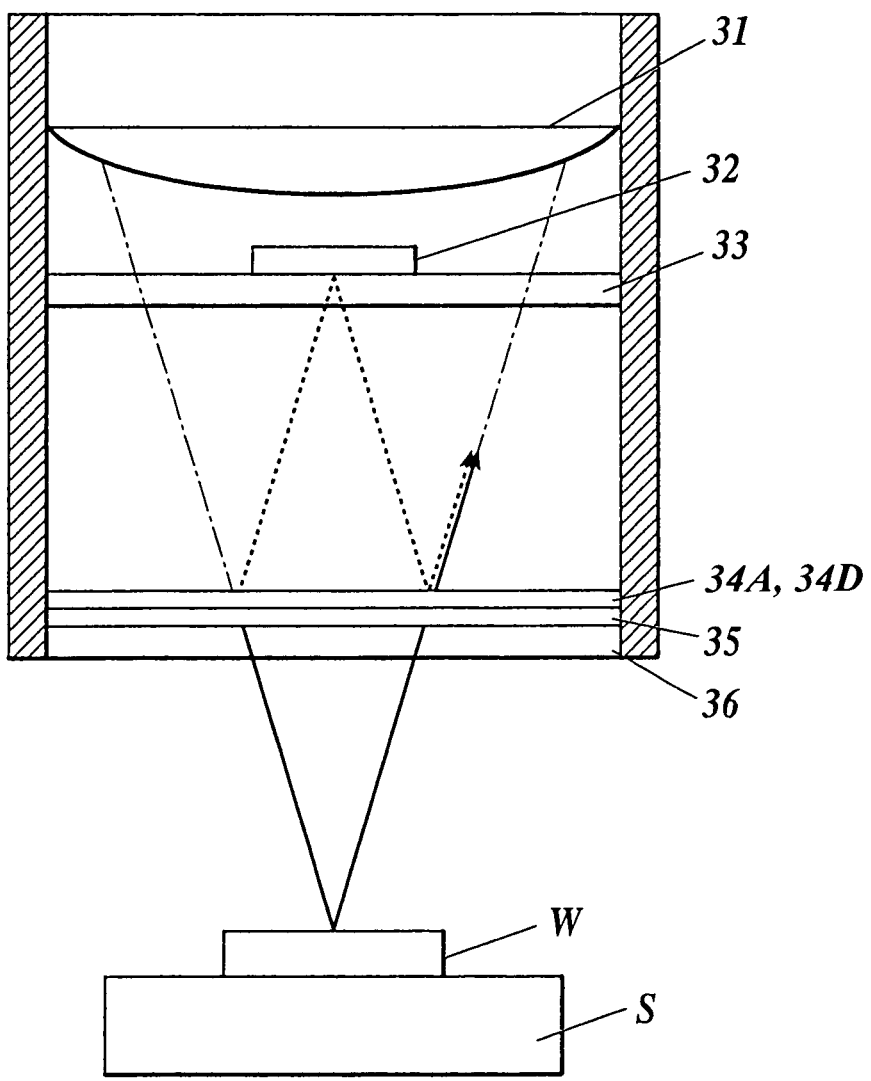
FIG. 6 is a principal part enlarged view showing the configuration of the objective lens section of the three-dimensional shape measuring apparatus of the first modification.

The basic configuration of the objective lens section 30A of the first modification is similar to that of the first embodiment, however, the objective lens section 30A includes a phase difference control member 34A as shown in FIG. 6. The phase difference control member 34A includes a laminated metal film 34D on a dielectric multilayer film.

At the objective lens section 30A, the polarization states of a reference light and an object light can be uniformed by the phase difference control member 34A, and the contrast of interference fringes can consequently be improved.

Therefore, tt is a matter of course that the first modification can obtain the advantages similar to those of the first embodiment, and further, the first modification consequently enables more accurate measurement because the dark parts of interference fringes can be made darker in the first modification.

(Second Modification)

Figure 7:
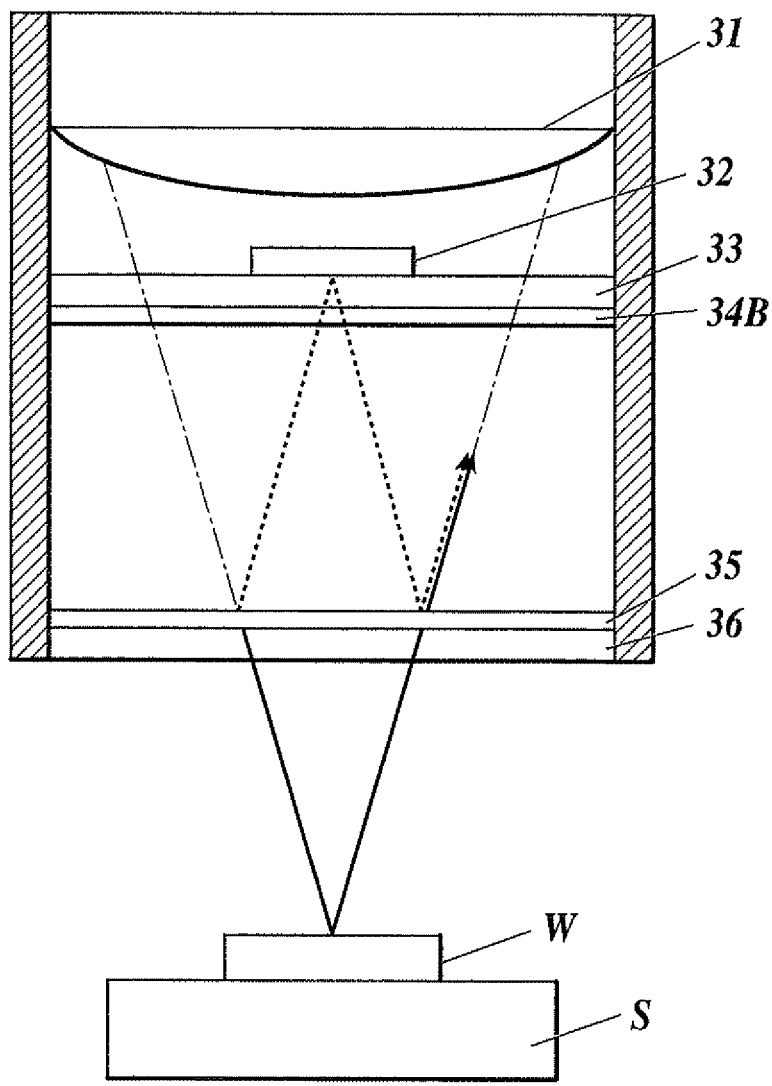
FIG. 7 is a principal part enlarged view showing the configuration of the objective lens section of the three-dimensional shape measuring apparatus of the second modification.

The basic configuration of the objective lens section 303 of the second modification is similar to that of the first embodiment, however, the objective lens section 30B includes a phase difference control member 343 which is provided on the side of the reference mirror 32 as shown in FIG. 7.

In particular, in the objective lens section 30B, the reference mirror 32 is provided to be mounted on the upper surface of the glass plate 33; the phase difference control member 34B is provided on the under surface of the glass plate 33; and the phase of the reference light is reversed by 180° by transmitting through the phase difference control member 34B twice. When the optical path lengths of the reference optical path and the measuring optical path are equal to each other, the phase of the reference light is shifted by 180° from the phase of the object light, vice vera. That is, because the reference light transmits through the glass plate 33 equipped with the dielectric multilayer film twice, wherein the glass plate 33 equipped with the dielectric multilayer film causes the phase to shift by 90° in one transmission of the light, the phase of the reference light is shifted from the phase of the object light by 180° in total.

Therefore, because the phases of the reference light and the object light are shifted from each other by 180°, the superposed wave of the reference light and the object light at the focused position becomes a destructive interference wave.

Incidentally, it is a matter of course that the phase difference control member 343 used here can be adapted to have the configuration of laminating a metal film on the dielectric multilayer film shown in the first modification.

(Second Embodiment)

Next, the second embodiment of the present invention will be described.

The shape measuring apparatus (not shown) of the second embodiment includes an objective lens section 80 which is a Michelson type interference objective lens.

Figure 8:
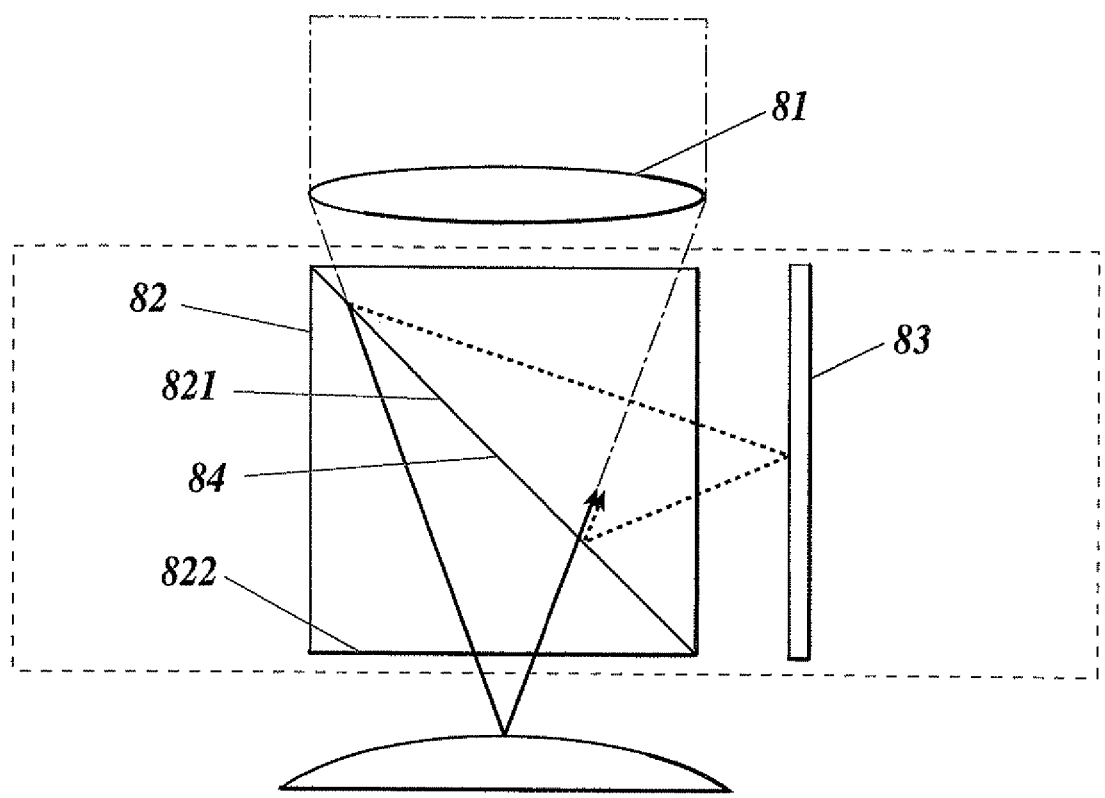
FIG. 8 is a schematic view showing the configuration of the objective lens section of the three-dimensional shape measuring apparatus of the second embodiment.
Figure 9A:
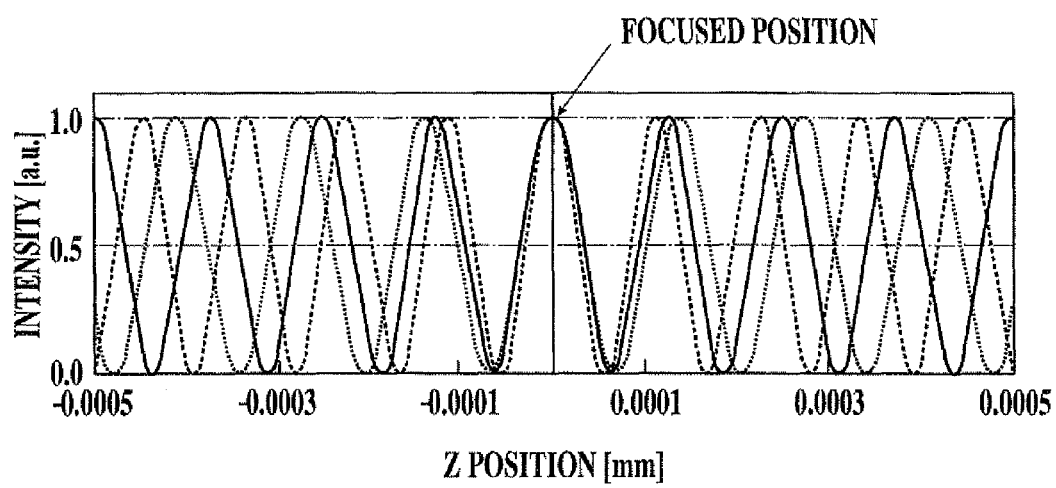
FIGS. 9A and 9B are diagrams for describing the principle of the occurrence of interference fringes generated by a white light.
Figure 9B:
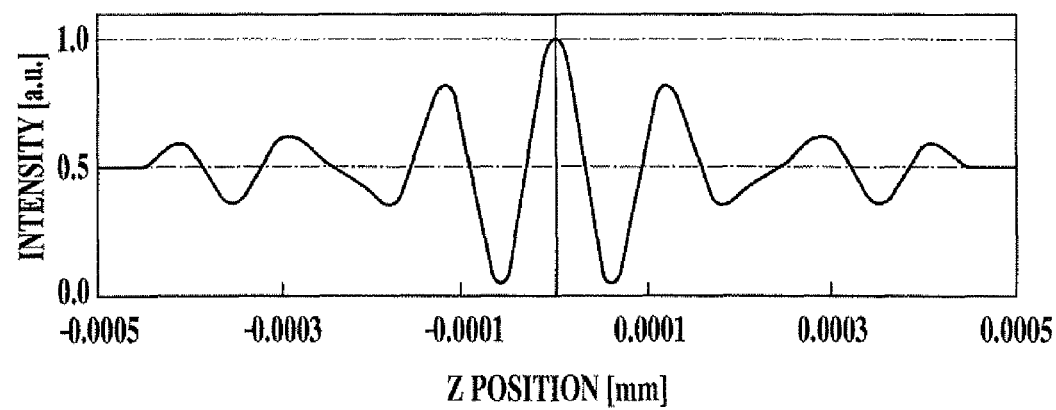
Figure 10:
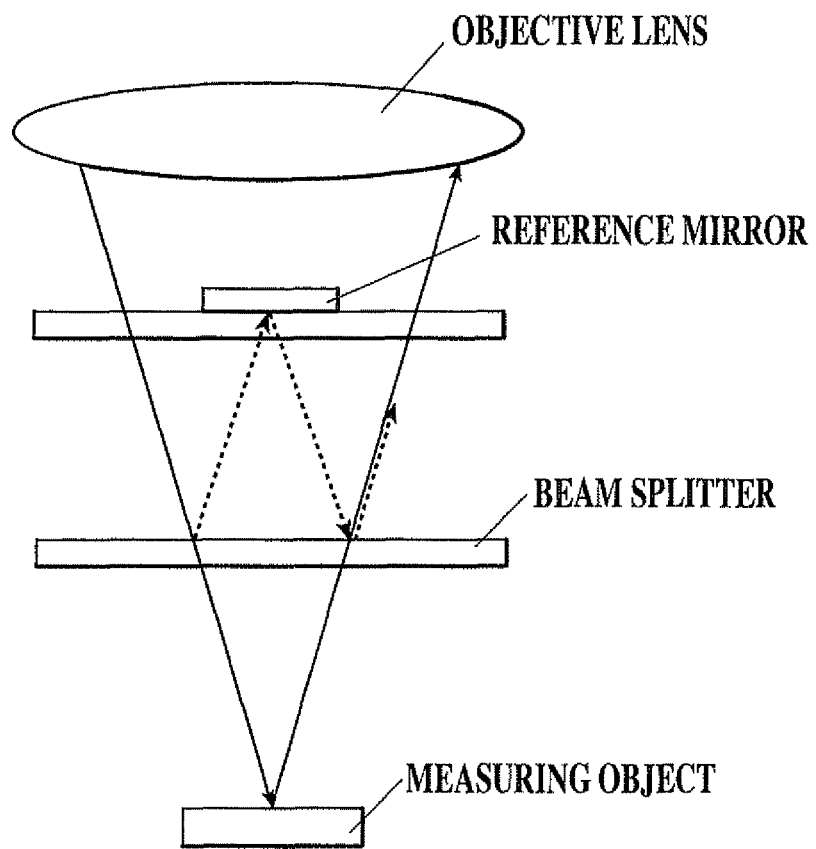
FIG. 10 is a schematic view showing the basic configuration of a Mirau type interference objective lens.
Figure 12:
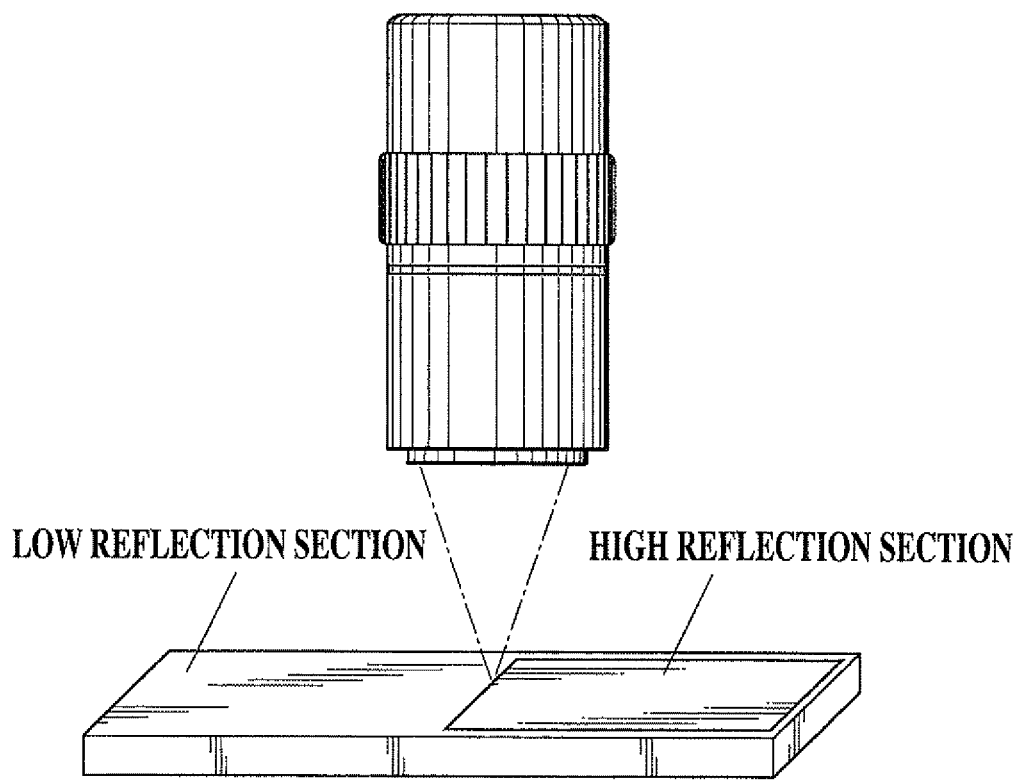
FIG. 12 is a schematic view showing the measurement of a measuring object including parts having different reflectances.
Figure 13A:
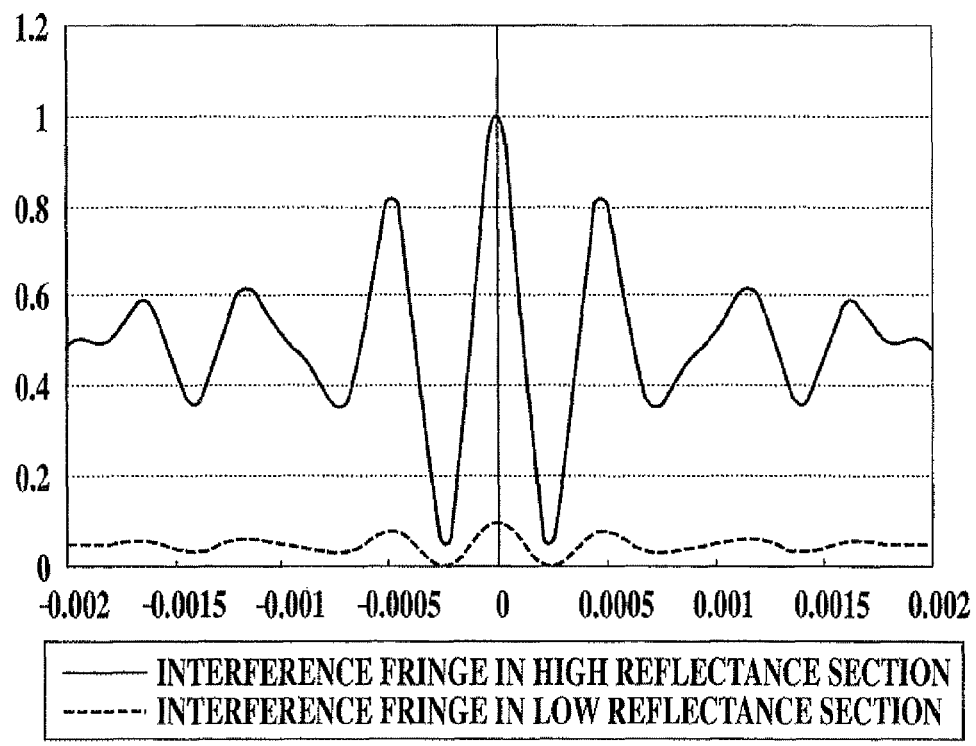
FIG. 13A is a diagram showing an example of the contrasts of interference fringes obtained by the conventional apparatus in the case where the light quantity is adjusted based on a high reflectance part.
Figure 13B:
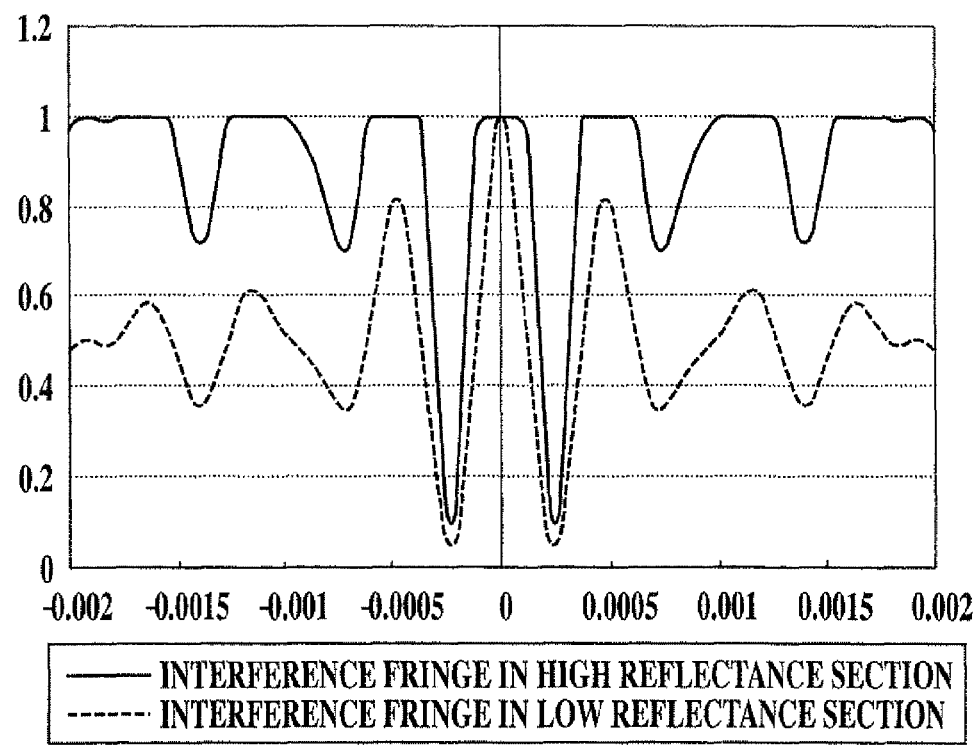
FIG. 13B is a diagram showing an example of the contrasts of interference fringes obtained by the conventional apparatus in the case where the light quantity is adjusted based on a low reflectance part.

The objective lens section 80 includes an objective lens 81, a prism 82 and a reference mirror 83 as shown in FIG. 8.

In the objective lens section 80, when a collimated light enters the objective lens 81 from above, the incident light is converged to a convergent light by the objective lens 81, and the convergent light enters a reflection surface 821 in the prism 82. Here, the incident light branches into a reference light reflected by the reflection surface 821 and an object light transmitting through the reflection surface 821. The reference light advances in a reference optical path (denoted by a broken line in the drawing) including the reference mirror 83 therein. The object light advances in a measuring optical path (denoted by a solid line in the drawing) including the measuring object W arranged therein.

The reference light converges to be reflected by the reference mirror 83, and is further reflected by the reflection surface 821 of the prism 82. On the other hand, the object light converges to be reflected by the measuring object W, and is transmitted through the reflection surface 821 of the prism 82. The reference light and the object light are superposed by the reflection surface 821 of the prism 82 to be an interference wave.

Here, a phase difference control member 84 is formed on the reflection surface 821 of the prism 82.

Therefore, because the object light passes through the phase difference control member 84 twice, the phase of the object light is reversed by 180°. Consequently, the reference light and the object light can generate destructive interference fringes at the position at which the optical path difference is zero.

Here, the phase difference control member 84 may be provided on the reference mirror 83, or may be provided on the surface 822, opposed to the measuring object W, of the prism 82.

Further, the phase difference control member may be the dielectric multilayer film shown in the first embodiment, or may be a laminated body formed of the dielectric multilayer film and the metal film shown in the first modification.

Although the first and second embodiments, and the modifications are described by exemplifying the phase difference control member which shifts the phase of a light passing through the phase difference control members by 90°, any configurations can be included in the scope of the present invention as long as the configurations can control the phase difference between a reference light and a object light to generate destructive interference fringes at the position at which the optical path difference is zero. For example, the configuration in which a member for reversing the transmitted light by 180° is provided on a reference mirror can be adopted, or the configuration in which two member each of which reversing the transmitted light by 45° are provided and the light transmits each member twice so as to be reversed by 180°, may be adopted.

The entire disclosure of Japanese Patent Application No. 2010-055973 filed on Mar. 12, 2010 including description, claims, drawings, and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:

1. A light-interference measuring apparatus, comprising:
a light source to output a broad band light;
an objective lens section to branch an optical path of the broad band light output from the light source into a reference optical path including a reference mirror and a measuring optical path including a measuring object, and to output a superposed wave of a reference light reflected by the reference mirror and an object light reflected by the measuring object; and
an imaging section to form an interference image data of the superposed wave output from the objective lens section, the objective lens section includes:
a phase difference control member configured to shift a phase of the object light by 180° when the object light transmits through the phase difference control member twice so as to generate destructive interference fringes at a position at which an optical path difference between the reference optical path and the measuring optical path is zero,
a minimum luminance position detecting section configured to detect a minimum luminance position of the destructive interference fringes based on the interference image data formed by the imaging section, wherein the object light passing through the measuring optical path transmits through the phase difference control member twice and thereby the phase of the transmitted light is shifted by 180°, and the reference light passing through the reference optical path is reflected from the phase difference control member so as to retain a phase of the light.

2. The light-interference measuring apparatus of claim 1, wherein the phase difference control member is a multilayer thin film including a dielectric film.

3. The light-interference measuring apparatus of claim 2, wherein a metal film is laminated on the dielectric film.

4. The light-interference measuring apparatus of claim 1, wherein
   the objective lens section includes a beam splitter to branch the optical path of the broad band light output from the light source into the reference optical path and the measuring optical path; and
   the phase difference control member is attached to the beam splitter.

5. The light-interference measuring apparatus of claim 1, wherein in the objective lens section,
   the phase difference control member is arranged at a reflection surface side of the reference mirror.

* * * * *